US012743813B2

(12) United States Patent
He et al.

(10) Patent No.: US 12,743,813 B2
(45) Date of Patent: Sep. 22, 2026

(54) DYNAMIC CALIBRATION OF DEPTH CAMERA AND UWB BEACON

(71) Applicant: Dell Products L.P., Round Rock, TX (US)

(72) Inventors: Xuebin He, Westwood, MA (US); Yichun Xu, Everett, MA (US); Michael Robillard, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/052,105

(22) Filed: Feb. 12, 2025

(65) Prior Publication Data

US 2026/0237097 A1 Aug. 13, 2026

(51) Int. Cl.
*G06V 20/52* (2022.01)
*G06T 7/80* (2017.01)
*H04N 23/611* (2023.01)

(52) U.S. Cl.
CPC ................ *G06T 7/80* (2017.01); *G06V 20/52* (2022.01); *H04N 23/611* (2023.01); *G06V 2201/07* (2022.01)

(58) Field of Classification Search
CPC ........................................................ G06V 20/52
See application file for complete search history.

(56) References Cited

U.S. PATENT DOCUMENTS

2021/0304577 A1* 9/2021 Hollar .................. G06V 40/103

* cited by examiner

*Primary Examiner* — Michael H Hong
(74) *Attorney, Agent, or Firm* — Workman Nydegger

(57) ABSTRACT

One example method includes detecting, using a camera, a presence of a user in a sub-area of an operating environment, automatically performing a calibration process on a beacon/camera pair located in the sub-area to enable the beacon/camera pair to generate a coordinate system that corresponds to the sub-area, acquiring, by the beacon using the coordinate system, a location of the user in the sub-area, tracking, using the beacon, movement of the user in the sub-area, detecting when the user is moving out of range of the beacon/camera pair, and handing off the user to another beacon/camera pair.

20 Claims, 3 Drawing Sheets

DYNAMIC CALIBRATION OF DEPTH CAMERA AND UWB BEACON

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to processes, infrastructure, and algorithms that are needed to generate data network effects that may serve to improve the predictions and performance of generative AI (artificial intelligence) systems. More particularly, at least some embodiments relate to systems, hardware, software, computer-readable media, and methods for dynamic calibration of depth camera and UWB (ultra wideband) beacons.

BACKGROUND

Beacon and camera systems have been used as one approach for obtaining the location of a user. While such systems have proven useful in some circumstances, there remain some problems in this field. For example, conventional 2+ beacon and camera systems are typically used to obtain a relative location of a user, but not the exact location of the user. As another example, the calibration approaches used in conventional systems may not be cost-efficient.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
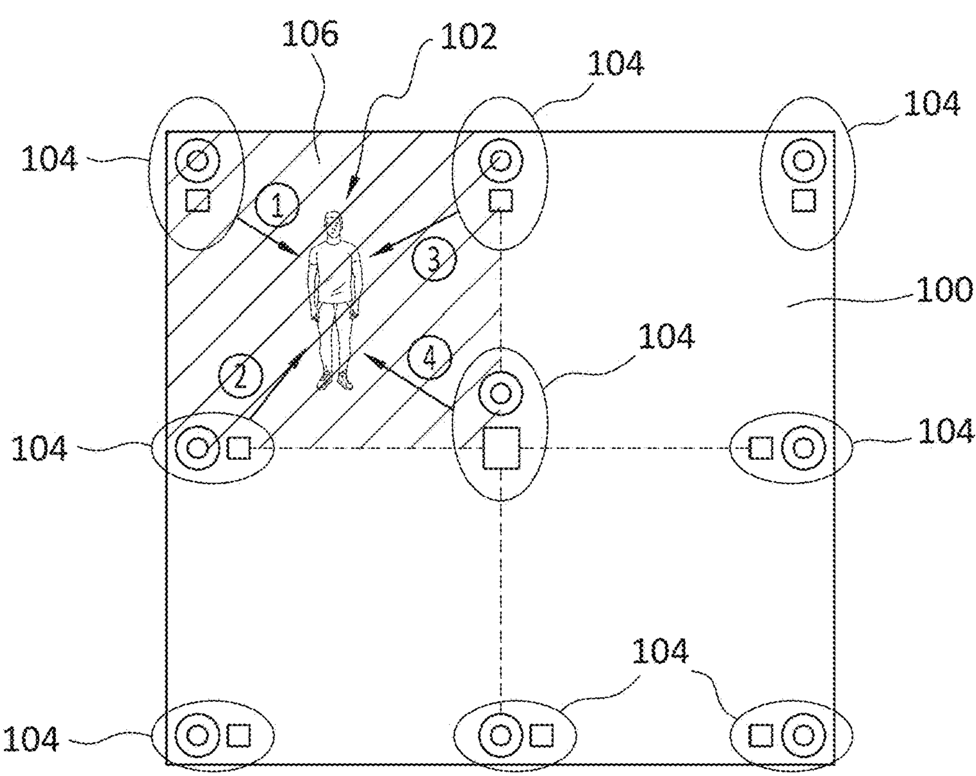
FIG. 1 discloses aspects of a schema where a user is in a first location, according to one embodiment.

Embodiments disclosed herein generally relate to processes, infrastructure, and algorithms that are needed to generate data network effects that may serve to improve the predictions and performance of generative AI (artificial intelligence) systems. More particularly, at least some embodiments relate to systems, hardware, software, computer-readable media, and methods for dynamic, and automatic, calibration of depth camera and UWB (ultra wideband) beacons.

One or more embodiments may be implemented in connection with two or more camera/beacon pairs deployed in a physical environment or space. An example method according to one embodiment may be performed by two, or more, camera/beacon pairs in an environment that has various areas, each monitored by camera beacon pairs. An area monitored by one or more camera/beacon pairs may, or may not, overlap with an area monitored by another one or more camera/beacon pairs.

A method according to one embodiment, which may be performed with respect to an operating environment, may comprise various operations, including: detecting, using a camera, the presence of a user in a sub-area or area of the operating environment; automatically performing a calibration process for a beacon/camera pair to generate a coordinate system that corresponds to a portion of the operating environment in which two or more pairs are deployed; acquiring, using a beacon, a location of the user; tracking, using the beacon, movement of the user in the sub-area or area; detecting when the user is moving out of range of one or more of the pairs; and, handing off the user to one or more other pairs, and entering an idle state.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that an embodiment may determine an exact, rather than estimated, location of a user within a particular area. An embodiment may automatically perform a calibration process for a beacon/camera pair to enable the pair to generate a coordinate system that corresponds to a monitored area. Various other advantages of one or more example embodiments will be apparent from this disclosure.

A. Context for One or More Embodiments for One Embodiment

The following is a discussion of aspects of a context for various embodiments. This discussion is not intended to limit the scope of the claims or this disclosure, or the applicability of the embodiments, in any way.

A.1 Introduction

The retail industry is undergoing a profound transformation driven by rapidly changing consumer preferences, technological advancements, and increasing competition. To remain relevant and competitive in this dynamic landscape, retail enterprises face the challenge of finding innovative ways to engage customers, reduce transactional friction, enhance their shopping experiences, build their brands, and drive business transformation.

This disclosure encompasses a variety of areas. These include, but are not necessarily limited to: product visualization, virtual try-on, store optimization, consumer privacy, and interactive kiosks. By leveraging these technologies, retailers can cater to the increasing demands of tech-savvy consumers who seek convenient, immersive, and informative shopping encounters. As discussed in detail elsewhere herein, some particular embodiments concern the calibration of 2+ beacon and camera systems to obtain an exact, rather than relative, location of a user, and the utilization of dynamic calibration among the systems to reduce cost.

One or more embodiments may involve what are sometimes referred to as data network effects. For example, processes, infrastructure, and algorithms may be used to generate data network effects. A data network effect refers to the situation where the value of a system increases as more data accumulates within it. Realistic creation of data network effects may be attained by automatically capturing and processing contextualized. Data network effects are commonly leveraged in generative AI systems.

Generative AI requires large datasets that must be kept fresh through back-and-forth customer interactions, such as with a virtual assistant for example. To remain competitive, an AI operator must corral data, analyze it, offer predictions, and then seek feedback, such as from one or more users, to sharpen subsequent suggestions. The value of generative AI systems depends on the data that is automatically collected from users. The generative AI system performance—its ability to accurately predict and suggest—thus hinges on the economic principle referred to as data network effects.

Useful bits of data, such as may be generated and employed in a generative AI system, can be found everywhere. As an example, data may come from interactions with buyers, suppliers, and coworkers. A retailer, for example, could track what consumers looked at, what they placed in their cart, and what they ultimately paid for. These minute, seemingly trivial, details can vastly improve the predictions of a generative AI system. This data need not necessarily be sourced from humans pounding keyboards. Such data may, instead, be sensed and gathered using devices and sensors such as microphones, cameras, and other high-resolution sensors, and processed using "Distributed ML" or "Field AI" on tailored infrastructure.

A.2 Example Aspects of Various Embodiments

It is expected that immersive technology will become a key enabler of business transformation because it enables humans to interact with business information persisted in datastores, machinery represented as digital twins, and artificial intelligence easily and as equals. This idea may be referred to as the immersive enterprise. This disclosure defines an immersive enterprise as a business that leverages immersive technology to perform business transformation. This idea is aligned with what some in the industry define as spatial computing.

Within spatial or immersive environments, other ability to model and improve business processes is only constrained by the processing capabilities of the underlying infrastructure. Thus, an embodiment can leverage real-world physics, or not. An embodiment may make a simulated environment track real time operations or replay the past. Historical analysis, exploratory planning, and new product introduction all become easier. Having these capabilities available to the average business has never happened before. It has the potential to dramatically improve businesses and to reduce transactional friction.

One example embodiment, discussed elsewhere herein, is focused on the retail vertical. However, it is noted that the concepts disclosed herein are largely transferable or applicable to other verticals.

B. Detailed Discussion of Aspects of One or More Embodiments

B.1 Introduction

One or more example embodiments are generally concerned with a deployment and algorithm method to build a UWB beacon and depth camera system for profile building in a more efficient, accurate and low-cost way. In this disclosure, a camera & beacon, or 'camera and beacon,' pair embraces, but is not necessarily limited to, the combination of a UWB beacon and a stereoscopic camera which can see depth.

In a method according to one embodiment, calibration between systems is required to obtain the exact location of a user. One example embodiment involves mounting multiple pairs of camera and beacons from the same manufacturer. With the calibration of the camera and beacon performed in the manufacturer factory, it may be expected that each beacon and camera are able to communicate with each other without any impediments. Further, the calibration between different sets of beacons and cameras may be performed automatically as a user moves throughout a given space. Thus, an embodiment may save equipment cost—as a single camera can be turned in different directions to cover different areas, enhance accuracy—as the system obtains an exact location of a user instead of only a relative location of the user, and reduces maintenance cost, due to automation of processes including the user location process.

There are various other virtual assistant platforms currently, including Amazon Just Walk Out, Amazon Smart Grocery Carts, Walmart Smart Check Out, and the Walmart Intelligent Retail Lab. By way of contrast with these platforms however, one or more embodiments may leverage features and aspects such as cellphone-based radio telemetry in combination with photonic camera data. In addition, the unique sensing, edge-based compute, and use of gesture-controlled display technology, creates differentiation.

B.2 Discussion

B.2.1 Overview

One or more embodiments may have various capabilities, although no embodiment is required to have any particular capability, or capabilities. For example, one or more embodiments enable the creation and use of an 'endless aisle' by using stereoscopic cameras, smart shelves, AI models, procedural code, ultra-wide band radio beacons, smartphone applications, and computer displays. Some example capabilities of one or more embodiments include, but are not limited to:

1. [PROCESS, INFRA, ALGO FLOW] Fast UWB calibration with depth camera to form absolute coordinate system that aligns with the physical world
2. [PROCESS, INFRA, ALGO FLOW] Dynamic and automated calibration process with the utilization of 2 or more pairs of camera & UWB beacon.

B.2.2 Aspects of an Example Architecture

Figure 2:
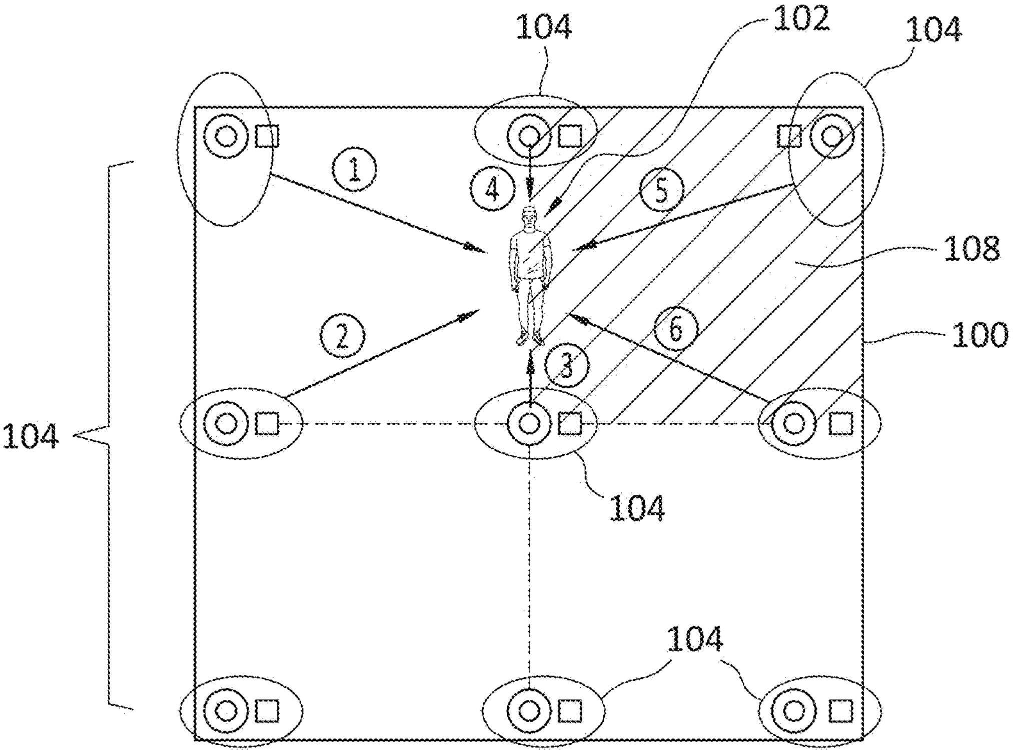
FIG. 2 discloses aspects of a schema where the user has moved from the first location of FIG. 1 to a second location, according to one embodiment.

With reference now to FIGS. 1 and 2, aspects of an example architecture, and associated operations, according to one embodiment, are disclosed. In terms of context for the following discussion, FIGS. 1 and 2 disclose an operating environment 100 through which a user 102 is able to move. The operating environment 100 may comprise any physical space through which the user may move, whether by walking or some mechanized vehicle. Example physical spaces include, but are not limited to, retail stores and other commercial environments.

As shown in FIGS. 1 and 2, various beacon/camera pairs 104, which may also be referred to herein as a 'pair,' may be distributed at various locations throughout the operating environment 100. One or more of the beacons may comprise a UWB beacon, and one or more of the cameras may comprise a stereoscopic camera. In an embodiment, the UWB beacon and the stereoscopic cameras are produced by the same manufacturer so that they can communicate with each other without any difficulties. In an embodiment, a beacon/camera pair may comprise a beacon and a stereoscopic camera. One embodiment may use 2 or more pairs, rather than simply a single pair. In the example of FIGS. 1 and 2, the pairs 104 are disposed in a grid, or cell, arrangement, but that is not necessarily required.

As shown, for example, in the upper left quadrant of the operating environment 100 disclosed in the Figures, four pairs 104 may define a sub-area 106, or cell section, through which a user may move. An operating environment 100 may be divided into any number of sub-areas of any size and shape. Moreover, a grid may be square, rectangular, polygonal, circular, or any other shape that enables effective use of one or more pairs.

In an embodiment, two pairs are mounted on different locations of a given space and pointing towards the same area. One or more of the cameras may be mounted on an adjustable base so that the camera can turn toward different directions. The two pairs may be calibrated with each other during set up. The calibration process may be performed using, for example, an open-source calibration program. As discussed herein, an embodiment may employ such infrastructures, that is, the pairs 104 distributed throughout the operating environment 100, and the calibration algorithm(s) in ways that differ from conventional approaches.

B.2.3 Aspects of Some Example Operations

When a user 102, such as a customer, enters the operating environment 100, the exact location of the user 102 will be captured by one or more of the pairs 104. As the user 104 moves in the operating environment 100, the UWB beacon signal may operate to capture the location of the user 102 in real time. That is, using cell-phone based radio telemetry, the UWB beacon may locate the user based on a location of the cell phone of the user in the operating environment 100. As well, the camera(s) of the pair(s) 104 may track and capture the image of the user 102 in real time as the user 102 moves through the operating environment 100. The image(s) of the user 102 may be captured at discrete instances in time, and/or continuously in time. In an embodiment, an adjustable base to which the camera is mounted enables the camera to adjust position so that it is constantly aimed at the user 102. In this way, as the user 102 walks into a new area of the operating environment, two, or more, pairs of beacon & camera will automatically calibrate the new area, such that no manual calibration is required. That is, the cameras and the beacons may be automatically calibrated such that after calibration, the cameras automatically generate a new, or modified, coordinate system that aligns with the physical operating environment 100. This process may be somewhat analogous to handoffs in a cell phone network in that the user 102 may, in effect, be handed off to a new/modified coordinate system, automatically generated and calibrated by the pair(s) 104 as the user 102 moves through the operating environment 100.

With continued reference to the examples of FIGS. 1 and 2, an embodiment may assume that every pair 104 was set with the same distance limit, that is, the maximum distance at which the pair 104 can effectively operate, so that every 4 pairs can cover one square area, such as the sub-area 106. As the user 102 moves to the next coverage area, the pair still tracks the user if the person is still in the range or distance limit. As shown in the example of FIG. 1, there are four pairs and, thus, four cameras, tracking the user 102 throughout the sub-area 106.

As the user 102 moves toward the next square area, denoted at sub-area 108 in FIG. 2, the pairs 104 keep track of the user 102 until the user 102 moves out of range, that is, when the user 102 location exceeds the distance limit for those pairs 104. This is why, in the example of FIG. 2 there are a total of six pairs tracking the user 102, as shown by the respective arrows extending from the pairs 104 to the user 102. After the user 102 enters the square area, or sub-area 108, on the right, the left most pairs 104, shown by the arrows (1) and (2), will no longer be able to keep track of the user 102. As a result, it will eventually be the case that only the pairs 104 shown by arrows (3), (4), (5), and (6) will be tracking the user 102. As the user 102 moves into, and out of, different sub-areas in the operating environment 100, the pairs 104 within range of the user 102 keep track of the person, automatically and dynamically calibrating new/modified coordinate systems when needed.

C. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other byway of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Figure 3:
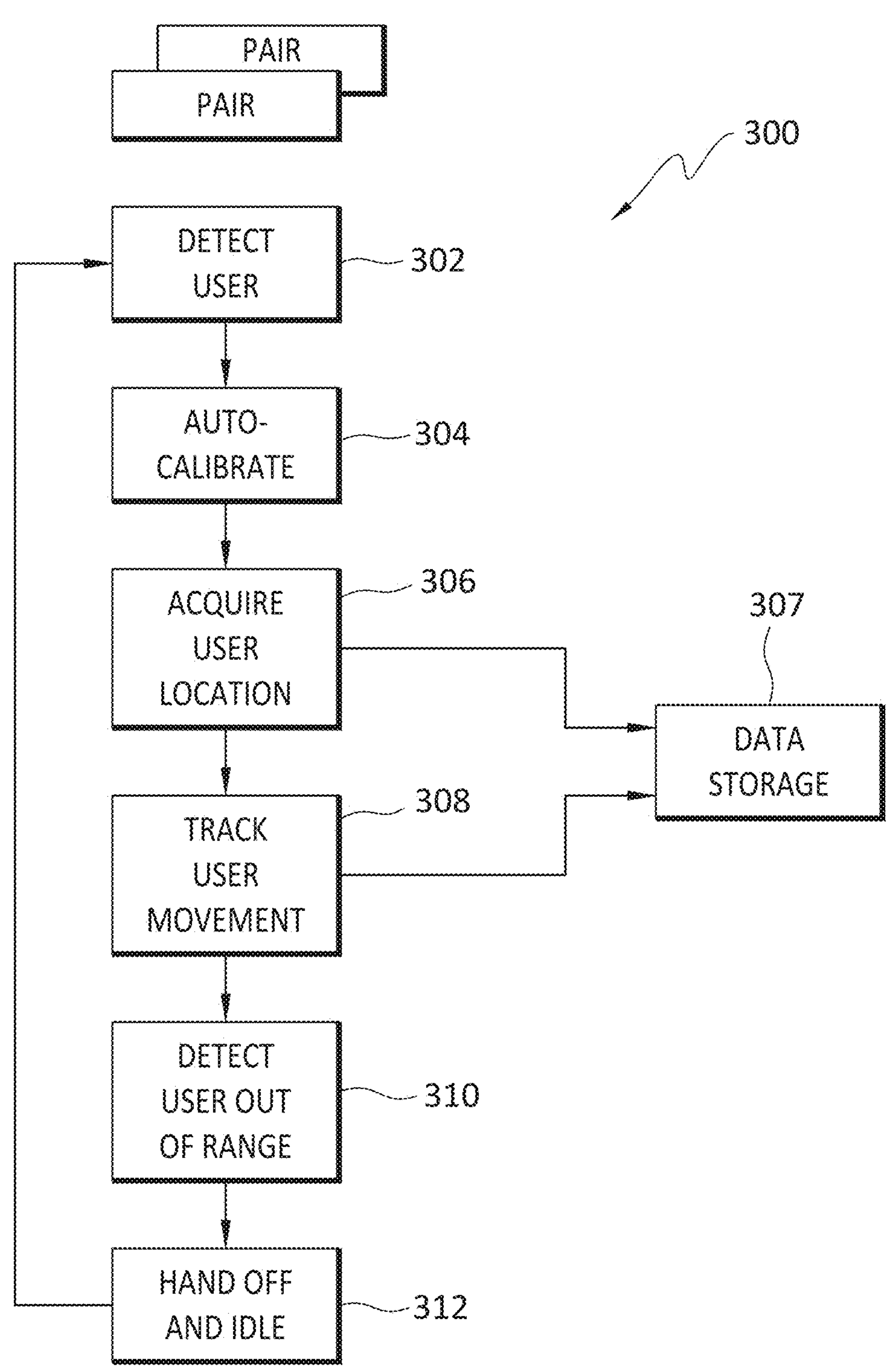
FIG. 3 discloses aspects of a method, according to one embodiment.

Directing attention now to FIG. 3, an example method 300 according to one embodiment is disclosed. The example method 300 may begin when a user is detected 302 by two or more UWB beacon/camera pairs. Upon detection 302, the pairs may automatically perform a calibration process 304 on the pair to enable the pair to define a coordinate system for the area where the user was detected 302. With the coordinate system thus established, the exact location of the user can be determined 306.

The user may then be tracked 308 as the user moves in the operating environment. The user location information, and user tracking information may be logged in a data storage 307. Tracking information may include, for example, the locations where a user stopped, and how long the user was at each of those locations, as well as the amount of time that it took for the user to transit the area that corresponds to the coordinate system.

At some point, the pairs may detect 310 that the user is moving out of range. Before, or after, the user is out of range, a handoff 312 may occur where one or more new pairs detect 302 the user, and the method 300 may be repeated. Once the user has moved out of range, the pairs no longer tracking the user may enter an idle status to save power.

D. Example Use Cases

Following are some example use cases for one or more embodiments. These are presented by way of illustration and are not intended to limit the scope of this disclosure, or any claims, in any way.

D.1 Example 1—Retail Store

An embodiment may be employed in a retail environment. For example, an embodiment may be used to help prevent shoplifting. When a bad credit customer enters the store, that information can trigger the system according to an embodiment s to focus on that bad credit customer. Multiple cameras mounted at different places may be called to focus on that customer. If the customer performs shoplifting, the behavior will be captured from different directions by one or more UWB beacon/camera pairs, thus avoiding the problem of blind spots that might enable the customer to engage in theft.

D.2 Example 2—Commercial Access Control

One embodiment may be used for access control. In particular, an embodiment may focus on monitoring people who trespass. As shown in the examples of FIGS. 1 and 2, different cameras will point to the person who walks into a restricted area. In this way, the actions performed by that person, including trespassing in a restricted area, may be captured and stored for future analysis and action.

E. Further Example Embodiments

Following are some further example embodiments. These are presented only by way of example and are not intended to limit the scope of this disclosure or the claims in any way.

Embodiment 1. A method, comprising: detecting, using a camera, a presence of a user in a sub-area of an operating environment; automatically performing a calibration process on a beacon/camera pair located in the sub-area to enable the beacon/camera pair to generate a coordinate system that corresponds to the sub-area; acquiring, by the beacon using the coordinate system, a location of the user in the sub-area; tracking, using the beacon, movement of the user in the sub-area; detecting when the user is moving out of range of the beacon/camera pair; and handing off the user to another beacon/camera pair.

Embodiment 2. The method as recited in any preceding embodiment, wherein the beacon is a UWB (ultrawideband) beacon.

Embodiment 3. The method as recited in any preceding embodiment, wherein the beacon tracks a cell phone of the user.

Embodiment 4. The method as recited in any preceding embodiment, wherein the operating environment comprises additional sub-areas, and each of the sub-areas is monitored by two or more beacon/camera pairs.

Embodiment 5. The method as recited in any preceding embodiment, wherein the camera follows the user as the user moves through the sub-area.

Embodiment 6. The method as recited in any preceding embodiment, wherein the operating environment comprises a retail store.

Embodiment 7. The method as recited in any preceding embodiment, wherein recalibration of one or more beacon/camera pairs is performed automatically as the user moves throughout the operating environment.

Embodiment 8. The method as recited in any preceding embodiment, wherein information about the user, and user movements, is retained in a log.

Embodiment 9. The method as recited in any preceding embodiment, wherein the camera comprises a stereoscopic depth camera.

Embodiment 10. The method as recited in any preceding embodiment, wherein the sub-area is covered by at least one additional beacon/camera pair.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 4:
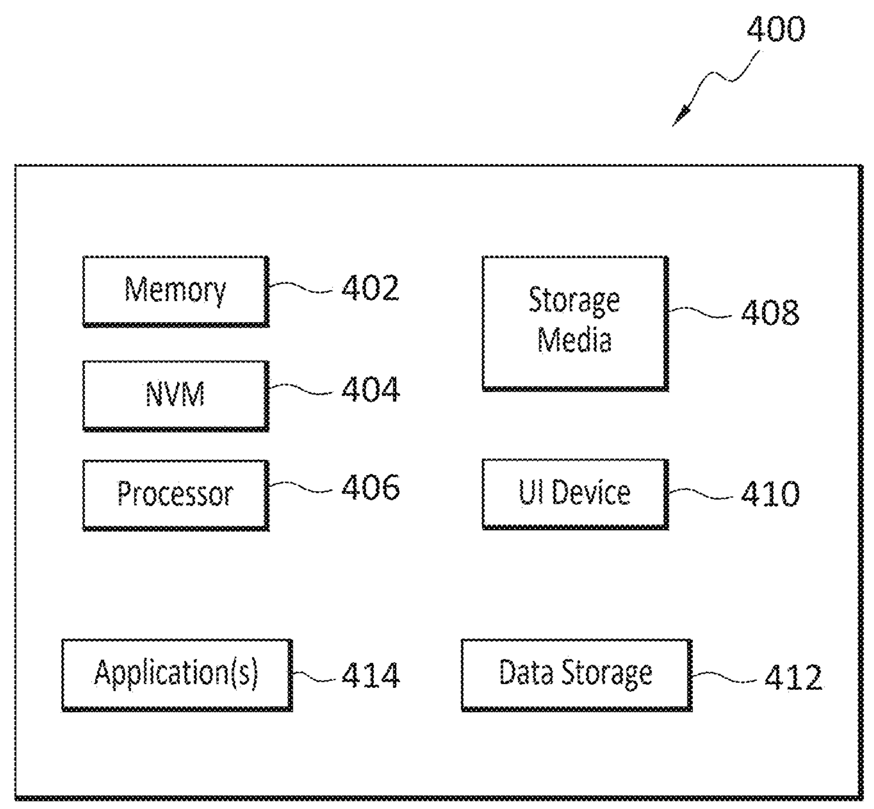
FIG. 4 discloses aspects of a computing entity configured, and operable, to perform any of the disclosed methods, processes, and operations, according to one embodiment.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method, comprising:

detecting, using a camera, a presence of a user in a sub-area of an operating environment;

automatically performing a calibration process on a beacon/camera pair located in the sub-area to enable the beacon/camera pair to generate a coordinate system that corresponds to the sub-area, wherein the sub-area is defined by a plurality of beacon/camera pairs, and the calibration process comprises automatically calibrating the beacon/camera pair with at least one other beacon/camera pair of the plurality of beacon/camera pairs to establish the coordinate system aligned with the physical sub-area;

acquiring, by the beacon using the coordinate system, a location of the user in the sub-area;

tracking, using the beacon, movement of the user in the sub-area;

detecting when the user is moving out of range of the beacon/camera pair; and handing off the user to another beacon/camera pair, wherein the handing off comprises automatically generating a different coordinate system corresponding to another sub-area defined by another plurality of beacon/camera pairs as the user enters the other sub-area.

2. The method as recited in claim 1, wherein the beacon is a UWB (ultrawideband) beacon.

3. The method as recited in claim 1, wherein the beacon tracks a cell phone of the user.

4. The method as recited in claim 1, wherein the operating environment comprises additional sub-areas, and each of the sub-areas is monitored by two or more beacon/camera pairs.

5. The method as recited in claim 1, wherein the camera follows the user as the user moves through the sub-area.

6. The method as recited in claim 1, wherein the operating environment comprises a retail store.

7. The method as recited in claim 1, wherein recalibration of one or more beacon/camera pairs is performed automatically as the user moves throughout the operating environment.

8. The method as recited in claim 1, wherein information about the user, and user movements, is retained in a log.

9. The method as recited in claim 1, wherein the camera comprises a stereoscopic depth camera.

10. The method as recited in claim 1, wherein the sub-area is covered by at least one additional beacon/camera pair.

11. A non-transitory storage medium having stored therein instructions that are executable by one or more hardware processors to perform operations comprising:

detecting, using a camera, a presence of a user in a sub-area of an operating environment;

automatically performing a calibration process on a beacon/camera pair located in the sub-area to enable the beacon/camera pair to generate a coordinate system that corresponds to the sub-area, wherein the sub-area is defined by a plurality of beacon/camera pairs, and the calibration process comprises automatically calibrating the beacon/camera pair with at least one other beacon/camera pair of the plurality of beacon/camera pairs to establish the coordinate system aligned with the physical sub-area;

acquiring, by the beacon using the coordinate system, a location of the user in the sub-area;

tracking, using the beacon, movement of the user in the sub-area;

detecting when the user is moving out of range of the beacon/camera pair; and handing off the user to another beacon/camera pair, wherein the handing off comprises automatically generating a different coordinate system corresponding to another sub-area defined by another plurality of beacon/camera pairs as the user enters the other sub-area.

12. The non-transitory storage medium as recited in claim 11, wherein the beacon is a UWB (ultrawideband) beacon.

13. The non-transitory storage medium as recited in claim 11, wherein the beacon tracks a cell phone of the user.

14. The non-transitory storage medium as recited in claim 11, wherein the operating environment comprises additional sub-areas, and each of the sub-areas is monitored by two or more beacon/camera pairs.

15. The non-transitory storage medium as recited in claim 11, wherein the camera follows the user as the user moves through the sub-area.

16. The non-transitory storage medium as recited in claim 11, wherein the operating environment comprises a retail store.

17. The non-transitory storage medium as recited in claim 11, wherein recalibration of one or more beacon/camera pairs is performed automatically as the user moves throughout the operating environment.

18. The non-transitory storage medium as recited in claim 11, wherein information about the user, and user movements, is retained in a log.

19. The non-transitory storage medium as recited in claim 11, wherein the camera comprises a stereoscopic depth camera.

20. The non-transitory storage medium as recited in claim 11, wherein the sub-area is covered by at least one additional beacon/camera pair.

* * * * *